Patented Mar. 22, 1927.

1,622,049

UNITED STATES PATENT OFFICE.

CLIFFORD H. RAMSEY, OF GLEN ROCK, NEW JERSEY.

TENTERING MACHINE.

Application filed October 11, 1926. Serial No. 140,748.

This invention relates to tentering machines of the class in which belongs the machine set forth in my Patent No. 1,576,220. In such machines the two long rails which guide the endless tentering chains and which also carry at their ends the rotary turrets around which the chains extend are supported by a row of structures arranged at intervals, of which one at one end of the row constitutes the power-plant of the machine, in that it comprises the gearing and other mechanism for driving the systems formed by said chains and turrets and for adjusting the rails with said systems toward or from each other. In many instances in the use of these machines it is necessary to apply heat to the fabric while being tentered, and in some cases the heat is confined by a tunnel-like housing extending lengthwise of the machine so as to contain more or less the whole extent of the rails. On account of the presence of the heat and in view of the great length of these machines (in very many instances, ninety feet and often more) the resulting expansion of the rails and chains has been a matter of great concern. Where the rails were each a continuous structure from end to end, as usual, then the expansion of the rails while the standards kept their places squarely on the floor would result in an upward bowing of the rails until the strain became so great that such rails or other vital parts of the machine would be fractured, or until, in consequence of the incidental depression of the ends of the rails, there developed a binding action of the gearing within the power plant and through which the adjacent turret is driven which made the machine fail to operate properly and imposed an undue load on the source of power: indeed, the matter of expansion has been so serious that frequently the machines were set up with the supporting structures tilted to appropriate angles to allow for the expansion—an expedient which both was unmechanical and produced straining of certain fixed parts and binding of parts intended to have free movement. Where, according to another construction, each rail was formed in spaced sections so as to allow for the expansion and avoid the bowing then there was the fault that the expansion of the chains unduly exceeded that of the over-all expansion of each rail-assembly, so that the chains were too loose to carry on the tentering operation successfully.

Now according to this invention I avoid all the difficulties due to expansion which have heretofore been experienced in the use of these machines. But first I note that in these machines transverse shiftability of each rail for adjusting them toward and from each other, so that they can operate on various widths of fabrics, is indispensable, and that for this purpose each is usually mounted on saddles which by suitable means are moved on the supporting structures transversely. So that each rail will be always definitely related to its saddles, suitable connections between them have to be provided and these have heretofore as to all the saddles been afforded by vertical studs or projections thereon fitting conforming holes in the rails. These connections, according to this invention, are constructed so that, while each rail is kept definitely related to its saddles with respect to movement transversely, there may be a creeping of the rail longitudinally with respect to the saddles, thus to avoid the bowing of the rail and the mentioned harmful incidents thereof; and in the preferred form the construction is such that whereas this longitudinal creeping is possible it is confined as to each rail to those of its saddles which appertain to all the supporting structures excepting that forming the power plant, where the rail is confined to its saddle against longitudinal as well as transverse shifting, whereby there being no longitudinal creeping at this point, binding of the gearing is avoided.

In the drawings,

Fig. 1 is a side elevation of a tentering machine embodying the present invention;

Figs. 2 and 3 are views showing the connection between a rail and the saddle therefor which appertains to the supporting structure affording the power plant, Fig. 2 showing certain parts in longitudinal and Fig. 3 certain parts in transverse section;

Figs. 4 and 5 are views substantially similar to Figs. 2 and 3, respectively, excepting that they show the connection between a rail and the saddle therefor which appertains to any one of the other supporting structures; and Fig. 6 is a plan of one of the rails, with a portion thereof broken away to show one of the connections appearing in Figs. 4 and 5.

In the illustrated example, and referring

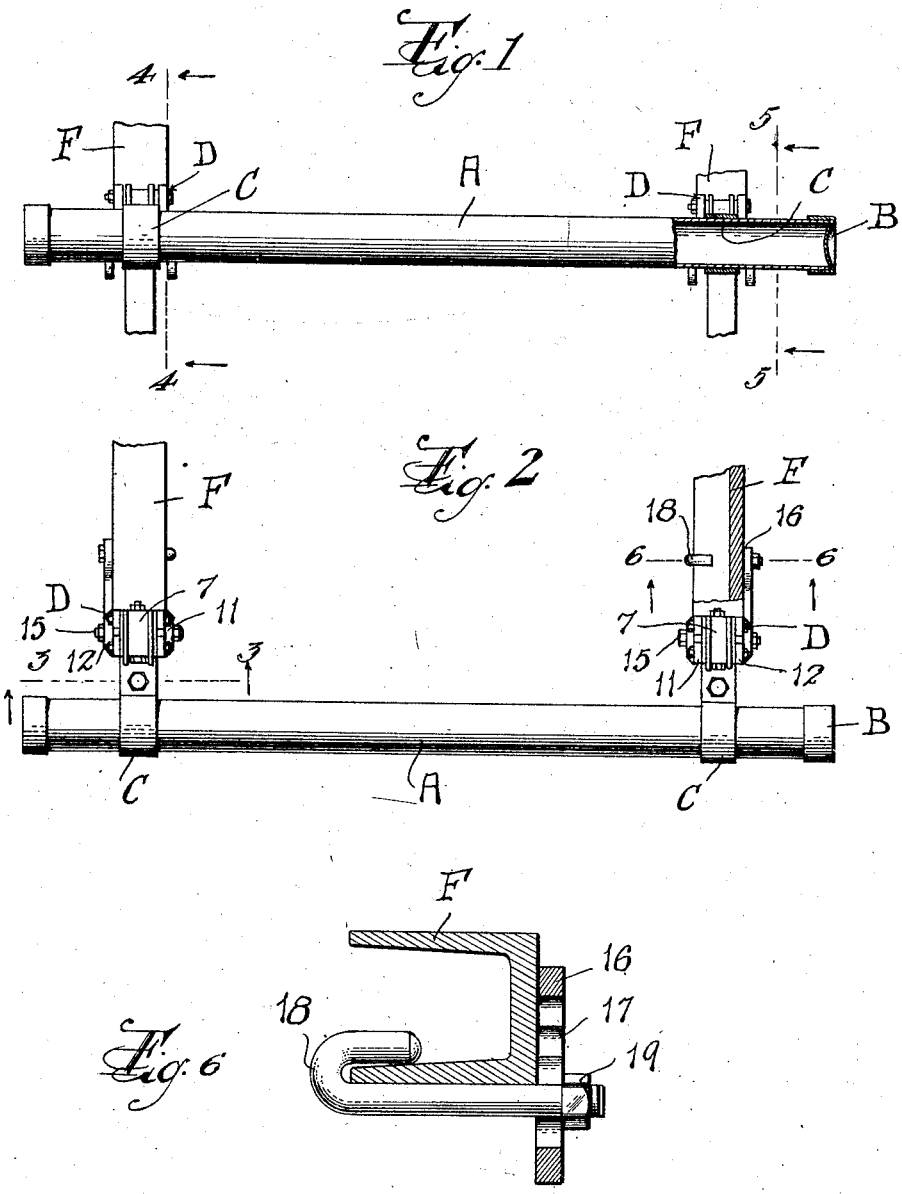

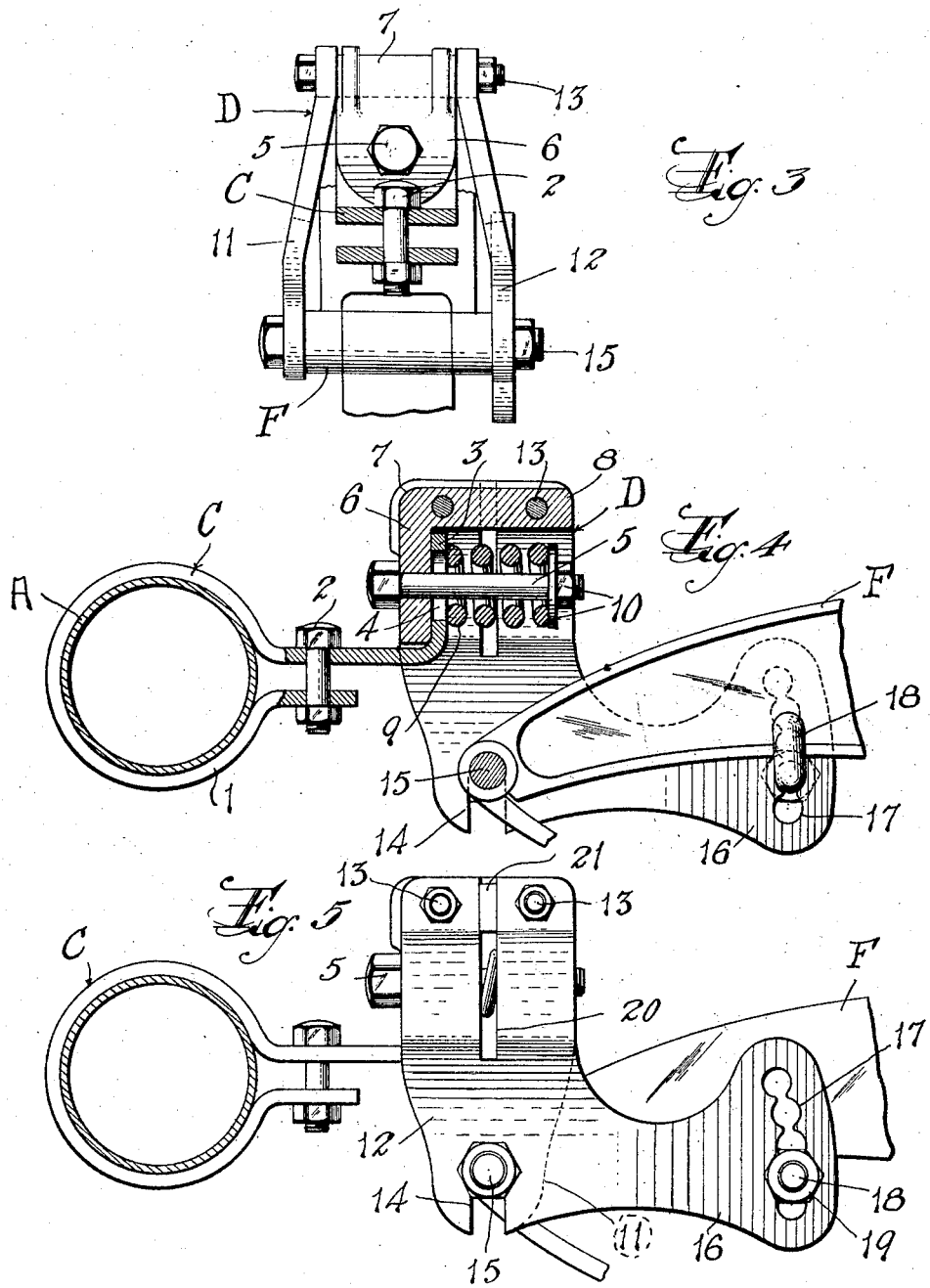

Patented Mar. 22, 1927.

1,622,050

UNITED STATES PATENT OFFICE.

FRANCESCO RENZULLI, OF NEWARK, NEW JERSEY.

VEHICLE BUMPER.

Application filed November 29, 1926. Serial No. 151,358.

This invention relates to vehicle bumpers of the type including an impact receiving or bumper bar, brackets for supporting the bar upon a vehicle, and shock absorbing springs interposed between the bumper bar and said brackets.

One object of the invention is to provide a vehicle bumper embodying novel and improved features of construction whereby the shocks or jars of impact or collision of the bumper with another vehicle or an obstruction are absorbed and dissipated in a plurality of directions by a composite movement of the bumper bar simultaneously in a plurality of directions relative to the vehicle, movement in each of the directions being yieldingly resisted by said shock absorbing springs, whereby the force of the impact is gradually and more fully absorbed or dissipated with a minimum of sudden shock and damage to the vehicle.

Another object is to provide a vehicle bumper of this character wherein the same springs absorb all of the forces exerted upon the bumper bar in its movements in all of said directions, whereby a simple construction having a minimum number of parts is obtained.

Other objects are to provide novel and improved brackets for mounting the bumper upon a vehicle whereby the bumper is adaptable to many different types of vehicles without modification in construction; to provide a strong reliable and durable bumper which will not easily get out of repair and which can be easily and quickly repaired when necessary, and to obtain other results and advantages as may be brought out by the following description.

Referring to the accompanying drawings, in which corresponding and like parts are designated throughout the several views by the same reference characters, Figure 1 is a front elevation, partially in section, of a vehicle bumper embodying my invention applied to the chassis of an automobile;

Figure 2 is a top plan view thereof;

Figure 3 is an enlarged sectional elevation, taken on the line 3—3 of Figure 2;

Figure 4 is a vertical sectional view, taken on the line 4—4 of Figure 1;

Figure 5 is a similar view, taken on the line 5—5 of Figure 1, and

Figure 6 is a transverse vertical sectional view, taken on the line 6—6 of Figure 2.

Specifically describing the illustrated embodiment of the invention, the reference character A designates the impact-receiving or bumper bar which is preferably in the form of a tube having its ends closed by suitable caps B, said bumper bar being mounted at opposite ends in clamps or supporting arms C which are movably mounted in brackets D one of which is secured to the forward end of each side bar F of the chassis of an automobile.

The clamps or supporting arms C may each be formed of one piece of strap metal one end of which is returned upon itself about the bumper bar A as indicated at 1, and secured to its main portion by a bolt 2, the other end of said clamp being bent at substantially right angles, as at 3, to the main portion and formed with a slot 4 through which passes a bolt 5 secured in a depending arm 6 of the body 7 of the corresponding bracket which is substantially right angular in longitudinal section, the other arm 8 thereof being disposed substantially horizontally. A helical compression spring 9 is interposed between the end 3 of each clamp C and a washer and nut 10 on the bolt 5, so that said spring normally holds the bent end 3 of the clamp against the inner side of the depending arm of the body 7 of the bracket, as clearly shown in Figure 4 of the drawings.

The body 7 of the bracket is secured between corresponding ends of the two side plates 11 and 12 by means of bolts 13. The other end of each of the plates 11 and 12 is formed with a slot 14 opening through the edge of the plate and adapted to slip over the bolt 15, which is ordinarily used for securing the spring or spring clip to the chassis bar F. As shown, the plates 11 and 12 are arranged at opposite sides of the chassis bar F and are clamped between the chassis bar and the head and nut respectively of the bolt 15. One of the plates, in the present instance the outside plate 12, has a rearwardly extending arm 16 which has an arcuate slot 17 concentric with the bolt 15. A hook bolt 18 has its hooked end connected to one flange of the chassis bar F and its threaded end passing through said slot 17 with the nut 19 clamping the arm 16 of the plate 12 between itself